United States Patent

Von Bebenburg et al.

[11] 3,917,629
[45] Nov. 4, 1975

[54] CERTAIN 2-OXY-5-PHENYL-6-AZA-7-CHLORO-1,2-DIHYDRO-3H-1,4-BENZODIAZEPINES

[75] Inventors: Walter Von Bebenburg, Buchschlag; Heribert Offermanns, Grossauheim, both of Germany

[73] Assignee: Deutsche Gold- und Silber-Scheideanstalt Vormals Roessler, Germany

[22] Filed: Apr. 22, 1974

[21] Appl. No.: 463,129

[30] Foreign Application Priority Data
May 8, 1973 Austria .......................... 4028/73

[52] U.S. Cl. ...... 260/296 H; 260/247.5 GP; 260/268 BC; 260/293.59; 424/263; 424/248; 424/250

[51] Int. Cl.² .................................. C07D 243/06

[58] Field of Search ................................ 260/296 H

[56] References Cited
OTHER PUBLICATIONS
von Bebenburg et al, Chem. Abstract, Vol. 79, (1973), 66412y.
Abstract of German Offen. 2259471, June 14, 1973.

*Primary Examiner*—Henry R. Jiles
*Assistant Examiner*—Bernard I. Dentz
*Attorney, Agent, or Firm*—Cushman, Darby & Cushman

[57] ABSTRACT

There are produced 6-aza-1,2-dihydro-3H-1,4-benzodiazepines of the formula:

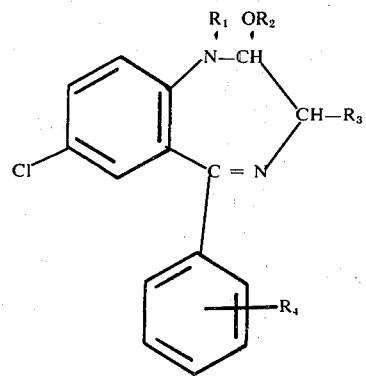

wherein:
$R_1$ is hydrogen, a lower alkyl group, a lower alkenyl group, a cycloalkyl group, a hydroxy lower alkyl group a lower alkoxy lower alkyl group, an amino-alkyl group, mono or dialkyl aminoalkyl or a 5 to 7 membered heterocyclic ring having 1 to 2 nitrogen atoms or 1 nitrogen atom and 1 oxygen atom in the ring attached to alkyl;
$R_2$ is hydrogen, lower alkyl or lower alkoxy lower alkyl;
$R_3$ is hydrogen, lower alkyl or lower alkoxy; and
$R_4$ is hydrogen or halogen and pharmaceutically acceptable salts thereof. The compounds have pharmacodynamic properties including psychosedative and especially anxiolytic properties as well as spasmolytic and antiphlogistic action.

12 Claims, No Drawings

CERTAIN 2-OXY-5-PHENYL-6-AZA-7-CHLORO-1,2-DIHYDRO-3H-1,4-BENZODIAZEPINES

The present invention concerns 6-aza-1,2-dihydro-3H-1,4-benzodiazepines of the formula:

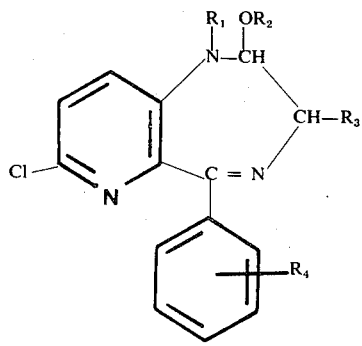

wherein:
$R_1$ is hydrogen, a lower alkyl group, a lower alkenyl group, a cycloalkyl group, a hydroxy lower alkyl group a lower alkoxy lower alkyl group, an aminoalkyl group, mono or dialkyl aminoalkyl or a 5 to 7 member heterocyclic ring having 1 to 2 nitrogen atoms or 1 nitrogen atom and 1 oxygen atom in the ring attached to alkyl;
$R_2$ is hydrogen, lower alkyl or lower alkoxy lower alkyl;
$R_3$ is hydrogen, lower alkyl or lower alkoxy; and
$R_4$ is hydrogen or halogen and pharmaceutically acceptable salts thereof. The compounds have pharmacodynamic properties including psychosedative and especially anxiolytic properties as well as spasmolytic and antiphlogistic action.

d. compounds of formula I the alkyl, alkoxy and hydroxyalkyl groups contain 1

(The 6 carbon atoms, preferably 1 to 4 carbon atoms, and the alkenyl group 2 to 6 carbon atoms. The cycloalkyl group contains 3 to 6, preferably 5 to 6 carbon atoms. The aminoalkyl can contain 2 to 7, preferably 2 to 5 carbon atoms and can be straight or branched chain. Preferably, there are two alkyl substituents on the nitrogen atoms having 1 to 6 carbon atoms, especially 2 to 4 carbon atoms. If the nitrogen atom of the aminoalkyl group constituent is part of a heterocyclic ring it is preferably a 6 membered ring. In the compounds of formula I the halogen atoms can have an atomic weight of 9 to 80, i.e., they can be chlorine, fluorine or bromine, preferably fluorine or chlorine.

Examples of the above-mentioned groups are methyl, ethyl, propyl, isopropyl, butyl, tert. butyl, hexyl, isobutyl, cyclopropyl, cyclopentyl, cyclohexyl, methoxy, ethoxy, propoxy, isopropoxy, butoxy, isobutoxy, tert. butoxy, amyloxy, hexoxy, allyl, crotyl, vinyl, methallyl, butenyl-(2), methoxymethyl, methoxyethyl, ethoxyethyl, ethoxypropyl, methoxyhexyl, ethoxybutyl, dimethylaminoethyl, diethylaminoethyl, diethylaminopropyl, aminoethyl, dimethylaminohexyl, dimethylaminoamyl, ethylaminoethyl, butylaminoethyl, dibutylaminopropyl, dihexylaminoethyl, N-piperidinoethyl, N-morpholinoethyl.

In addition to the compounds mentioned in the working examples, other compounds within the present invention include:
2-hydroxy-5-phenyl-6-aza-7-chloro-1,2-dihydroxy-3H-1,4-benzodiazepine;
2-hydroxy-5-(o-chlorophenyl)-6-aza-7-chloro-1,2-dihydroxy-3H-1,4-benzodiazepine;
2-hydroxy-5-(o-fluorophenyl)-6-aza-7-chloro-1,2-dihydroxy-3H-1,4-benzodiazepine;
2-hydroxy-5-(o-bromophenyl)-6-aza-7-chloro-1,2-dihydro-3H-1,4-benzodiazepine;
2-hydroxy-3-methyl-5-phenyl-6-aza-7-chloro-1,2-dihydro-3H-1,4-benzodiazepine;
2-hydroxy-3-ethyl-5-(o-chlorophenyl-6-aza-7-chloro-1,2-dihydro-3H-1,4-benzodiazepine;
2-hydroxy-3-isopropyl-5-phenyl-6-aza-7-chloro-1,2-dihydro-3H-1,4-benzodiazepine;
2-hydroxy-3-butyl-5-(o-fluorophenyl)-6-aza-7-chloro-1,2-dihydro-3H-1,4-benzodiazepine;
2-hydroxy-3-hexyl-5-(p-chlorophenyl)-6-aza-7-chloro-1,2-dihydro-3H-1,4-benzodiazepine;
2-hydroxy-3-methoxy-5-phenyl-6-aza-7-chloro-1,2-dihydro-3H-1,4-benzodiazepine;
2-hydroxy-3-ethoxy-5-(o-fluorophenyl)-6-aza-7-chloro-1,2-dihydro-3H-1,4-benzodiazepine;
2-hydroxy-3-propoxy-5-phenyl-6-aza-7-chloro-1,2-dihydro-3H-1,4-benzodiazepine;
2-hydroxy-3-butoxy-5-(o-chlorophenyl)-6-aza-7-chloro-1,2-dihydro-3H-1,4-benzodiazepine;
2-hydroxy-3-hexoxy-5-(o-fluorophenyl)-6-aza-7-chloro-1,2-dihydro-3H-1,4-benzodiazepine;
1-methyl-2-hydroxy-5-(o-chlorophenyl)-6-aza-7-chloro-1,2-dihydro-3H-1,4-benzodiazepine;
1-methyl-2-hydroxy-5-(o-fluorophenyl)-6-aza-7-chloro-1,2-dihydro-3H-1,4-benzodiazepine;
1-methyl-2-hydroxy-5-(o-bromophenyl)-6-aza-7-chloro-1,2-dihydro-3H-1,4-benzodiazepine;
1,3-dimethyl-2-hydroxy-5-phenyl-6-aza-7-chloro-1,2-dihydro-3H-1,4-benzodiazepine;
1-methyl-2-hydroxy-3-ethyl-5-phenyl-6-aza-7-chloro-1,2-dihydro-3H-1,4-benzodiazepine;
1,3-dimethyl-2-hydro-5-(o-chlorophenyl)-6-aza-7-chloro-1,2-dihydro-3H-1,4-benzodiazepine;
1-methyl-2-hydroxy-3-propyl-5-phenyl-6-aza-7-chloro-1,2-dihydro-3H-1,4-benzodiazepine;
1-methyl-2-hydroxy-3-sec. butyl-5-phenyl-6-aza-7-chloro-1,2-dihydro-3H-1,4-benzodiazepine;
1-methyl-2-hydroxy-3-amyl-5-(o-chlorophenyl)-6-aza-7-chloro-1,2-dihydro-3H-1,4-benzodiazepine;
1-methyl-2-hydroxy-3-hexyl-5-phenyl-6-aza-7-chloro-1,2-dihydro-3H-1,4-benzodiazepine;
1-methyl-2-hydroxy-3-methoxy-5-phenyl-6-aza-7-chloro-1,2-dihydro-3H-1,4-benzodiazepine;
1-methyl-2-hydroxy-3-methoxy-5-(o-fluorophenyl)-6-aza-7-chloro-1,2-dihydro-3H-1,4-benzodiazepine;
1-methyl-2-hydroxy-3-ethoxy-5-phenyl-6-aza-7-chloro-1,2-dihydro-3H-1,4-benzodiazepine;
1-methyl-2-hydroxy-3-ethoxy-5-(o-chlorophenyl)-6-aza-7-chloro-1,2-dihydro-3H-1,4-benzodiazepine;
1-methyl-2-hydroxy-3-propoxy-5-phenyl-6-aza-7-chloro-1,2-dihydro-3H-1,4-benzodiazepine;
1-methyl-2-hydroxy-3-butoxy-5-phenyl-6-aza-7-chloro-1,2-dihydro-3H-1,4-benzodiazepine;
1-methyl-2-hydroxy-3-hexoxy-5-(o-chlorophenyl)-6-aza-7-chloro-1,2-dihydro-3H-1,4-benzodiazepine;
1-methyl-2-methoxy-5-phenyl-6-aza-7-chloro-1,2-dihydro-3H-1,4-benzodiazepine;

1-methyl-2-methoxy-5-(o-fluorophenyl)-6-aza-7-chloro-1,2-dihydro-3H-1,4-benzodiazepine;
1-methyl-2-ethoxy-5-phenyl-6-aza-7-chloro-1,2-dihydro-3H-1,4-benzodiazepine;
1-methyl-2-ethoxy-3-methyl-5-phenyl-6-aza-7-chloro-1,2-dihydro-3H-1,4-benzodiazepine;
1-methyl-2-ethoxy-3-isopropyl-5-(o-chlorophenyl)-6-aza-7-chloro-1,2-dihydro-3H-1,4-benzodiazepine;
1-methyl-2-ethoxy-3-t-butyl-5-(o-fluorophenyl)-6-aza-7-chloro-1,2-dihydro-3H-1,4-benzodiazepine;
1-methyl-2-ethoxy-3-hexyl-5-phenyl-6-aza-7-chloro-1,2-dihydro-3H-1,4-benzodiazepine;
1-methyl-2-ethoxy-3-methoxy-5-(o-chlorophenyl)-6-aza-7-chloro-1,2-dihydro-3H-1,4-benzodiazepine;
1-methyl-2,3-diethoxy-5-phenyl-6-aza-7-chloro-1,2-dihydro-3H-1,4-benzodiazepine;
1-methyl-2-ethoxy-3-butoxy-5-(o-chlorophenyl)-6-aza-7-chloro-1,2-dihydro-3H-1,4-benzodiazepine;
1-methyl-2-ethoxy-3-hexoxy-5-phenyl-6-aza-7-chloro-1,2-dihydro-3H-1,4-benzodiazepine;
1-methyl-2-methoxyethoxy-5-phenyl-6-aza-7-chloro-1,2-dihydro-3H-1,4-benzodiazepine;
1-methyl-2-methoxymethoxy-5-phenyl-6-aza-7-chloro-1,2-dihydro-3H-1,4-benzodiazepine;
1-methyl-2-ethoxypropoxy-5-(o-chlorophenyl)-6-aza-7-chloro-1,2-dihydro-3H-1,4-benzodiazepine;
1-methyl-2-ethoxyhexoxy-5-phenyl-6-aza-7-chloro-1,2-dihydro-3H-1,4-benzodiazepine;
1-methyl-2-ethoxybutoxy-5-(o-chlorophenyl)-6-aza-7-chloro-1,2-dihydro-3H-1,4-benzodiazepine;
1-methyl-2-ethoxyethoxy-3-methyl-5-phenyl-6-aza-7-chloro-1,2-dihydro-3H-1,4-benzodiazepine;
2-methoxyethoxy-5-phenyl-6-aza-7-chloro-1,2-dihydro-3H-1,4-benzodiazepine;
1-ethyl-2-hydroxy-5-phenyl-6-aza-7-chloro-1,2-dihydro-3H-1,4-benzodiazepine;
1-ethyl-2-hydroxy-3-ethyl-5-(o-fluorophenyl)-6-aza-7-chloro-1,2-dihydro-3H-1,4-benzodiazepine;
1-ethyl-2-methoxy-5-phenyl-6-aza-7-chloro-1,2-dihydro-3H-1,4-benzodiazepine;
1-ethyl-2-methoxy-5-(o-chlorophenyl)-6-aza-7-chloro-1,2-dihydro-3H-1,4-benzodiazepine;
1-ethyl-2-ethoxy-5-phenyl-6-aza-7-chloro-1,2-dihydro-3H-1,4-benzodiazepine;
1-ethyl-2-butoxy-5-phenyl-6-aza-7-chloro-1,2-dihydro-3H-1,4-benzodiazepine;
1-propyl-2-hydroxy-5-(o-chlorophenyl)-6-aza-7-chloro-1,2-dihydro-3H-1,4-benzodiazepine;
1-propyl-2-ethoxy-5-phenyl-6-aza-7-chloro-1,2-dihydro-3H-1,4-benzodiazepine;
1-butyl-2-hydroxy-5-phenyl-6-aza-7-chloro-1,2-dihydro-3H-1,4-benzodiazepine;
1-butyl-2-hydroxy-3-methyl-5-phenyl-6-aza-7-chloro-1,2-dihydro-3H-1,4-benzodiazepine;
1-hexyl-2-hydroxy-5-phenyl-6-aza-7-chloro-1,2-dihydro-3H-1,4-benzodiasepine;
1-propyl-2-methoxy-5-phenyl-6-aza-7-chloro-1,2-dihydro-3H-1,4-benzodiazepine;
1-butyl-2-methoxy-5-phenyl-6-aza-7-chloro-1,2-dihydro-3H-1,4-benzodiazepine;
1-dihydro-2-ethoxy-5-(o-chlorophenyl)-6-aza-7-chloro-1,2-dihydro-3H-1,4-benzodiazepine;
1-hexyl-2-ethoxy-5-phenyl-6-aza-7-chloro-1,2-dihydro-3H-1,4-benzodiazepine;
1-vinyl-2-hydroxy-5-phenyl-6-aza-7-chloro-1,2-dihydro-3H-1,4-benzodiazepine;
1-allyl-2-hydroxy-5-phenyl-6-aza-7-chloro-1,2-dihydro-3H-1,4-benzodiazepine;
1-allyl-2-methoxy-5-(o-fluorophenyl)-6-aza-7-chloro-1,2-dihydro-3H-1,4-benzodiazepine;
1-allyl-2-ethoxy-5-(o-chlorophenyl)-6-aza-7-chloro-1,2-dihydro-3H-1,4-benzodiazepine;
1-allyl-2-propoxy-5-phenyl-6-aza-7-chloro-1,2-dihydro-3H-1,4-benzodiazepine;
1-allyl-2-ethoxy-3-methyl-5-phenyl-6-aza-7-chloro-1,2-dihydro-3H-1,4-benzodiazepine;
1-methallyl-2-hydroxy-5-phenyl-6-aza-7-chloro-1,2-dihydro-3H-1,4-benzodiazepine;
1-crotyl-2-ethoxy-5-(o-chlorophenyl)-6-aza-7-chloro-1,2-dihydro-3H-1,4-benzodiazepine;
1-cyclopropyl-2-hydroxy-5-phenyl-6-aza-7-chloro-1,2-dihydro-3H-1,4-benzodiazepine;
1-cyclopentyl-2-methoxy-5-phenyl-6-aza-7-chloro-1,2-dihydro-3H-1,4-benzodiazepine;
1-cyclohexyl-2-hydroxy-5-(p-chlorophenyl)-6-aza-7-chloro-1,2-dihydro-3H-1,4-benzodiazepine;
1-cyclohexyl-2-ethoxy-5-phenyl-6-aza-7-chloro-1,2-dihydro-3H-1,4-benzodiazepine;
1-hydroxymethyl-2-hydroxy-5-phenyl--aza-7-chloro-1,2-dihydro-3H-1,4-benzodiazepine;
1-hydroxymethyl-2-ethoxy-5-(o-chlorophenyl)-6-aza-7-chloro-1,2-dihydro-3H-1,4-benzodiazepine;
1-hydroxyethyl-2-hydroxy-5-(o-fluorophenyl)-6-aza-7-chloro-1,2-dihydro-3H-1,4-benzodiazepine;
1-hydroxyethyl-2-ethoxy-5-phenyl-6-aza-7-chloro-1,2-dihydro-3H-1,4-benzodiazepine;
1-hydroxypropyl-2-hydroxy-5-phenyl-6-aza-7-chloro-1,2-dihydro-3H-1,4-benzodiazepine;
1-hydroxybutyl-2-hydroxy-5-(o-chlorophenyl)-6-aza-7-chloro-1,2-dihydro-3H-1,4-benzodiazepine;
1-hydroxybutyl-2-methoxy-5-phenyl-6-aza-7-chloro-1,2-dihydro-3H-1,4-benzodiazepine;
1-hydroxyhexyl-2-ethoxy-5-phenyl-6-aza-7-chloro-1,2-dihydro-3H-1,4-benzodiazepine;
1-aminoethyl-2-hydroxy-5-(o-chlorophenyl)-6-aza-7-chloro-1,2-dihydro-3H-1,4-benzodiazepine;
1-aminopropyl-2-ethoxy-5-phenyl-6-aza-7-chloro-1,2-dihydro-3H-1,4-benzodiazepine;
1-aminopentyl-2-hydroxy-5-phenyl-6-aza-7-chloro-1,2-dihydro-3H-1,4-benzodiazepine;
1-amino-heptyl-2-methoxy-5-phenyl-6-aza-7-chloro-1,2-dihydro-3H-1,4-benzodiazepine;
1-methylamino-ethyl-2-hydroxy-5-phenyl-6-aza-7-chloro-1,2-dihydro-3H-1,4-benzodiazepine;
-ethylaminoethyl-2-ethoxy-5-(o-fluorophenyl)-6-aza-7-chloro-1,2-dihydro-3H-1,4-benzodiazepine;
1-propylaminoethyl-2-propoxy-5-phenyl-6-aza-7-chloro-1,2-dihydro-3H-1,4-benzodiazepine;
1-butylaminoethyl-2-hydroxy-5-phenyl-6-aza-7-chloro-1,2-dihydro-3H-1,4-benzodiazepine;
1-hexylaminoethyl-2-ethoxy-5-phenyl-6-aza-7-chloro-1,2-dihydro-3H-1,4-benzodiazepine;
1-dimethylaminoethyl-2-hydroxy-5-phenyl-6-aza-7-chloro-1,2-dihydro-3H-1,4-benzodiazepine;
1-dimethylaminoethyl-2-ethoxy-5-phenyl-6-aza-7-chloro-1,2-dihydro-3H-1,4-benzodiazepine;
1-diethylaminoethyl-2-hydroxy-5-phenyl-6-aza-7-chloro-1,2-dihydro-3H-1,4-benzodiazepine;
1-diethylaminoethyl-2-methoxy-5-phenyl-6-aza-7-chloro-1,2-dihydro-3H-1,4-benzodiazepine;
1-diethylaminoethyl-2-ethoxy-5-phenyl-6-aza-7-chloro-1,2-dihydro-3H-1,4-benzodiazepine;
1-diethylaminoethyl-2-ethoxy-3-methyl-5-(o-chlorophenyl)-6-aza-7-chloro-1,2-dihydro-3H-1,4-benzodiazepine;
1-diethylaminopropyl-2-hydroxy-5-phenyl-6-aza-7- chloro-1,2-dihydro-3H-1,4-benzodiazepine;
1-diethylaminopropyl-2-ethoxy-5-phenyl-6-aza-7-chloro-1,2-dihydro-3H-1,4-benzodiazepine;
1-diethylaminobutyl-2-hydroxy-5-phenyl-6-aza-7-chloro-1,2-dihydro-3H-1,4-benzodiazepine;
1-diethylaminopentyl-2-methoxy-5-phenyl-6-aza-7-chloro-1,2-dihydro-3H-1,4-benzodiazepine;
1-dimethylaminohexyl-2-ethoxy-5-phenyl-6-aza-7-chloro-1,2-dihydro-3H-1,4-benzodiazepine;
1-diethylaminoheptyl-2-hydroxy-5-(o-chlorophenyl)-6-aza-7-chloro-1,2-dihydro-3H-1,4-benzodiazepine;
1-dipropylaminoethyl-2-hydroxy-5-phenyl-6-aza-7-chloro-1,2-dihydro-3H-1,4-benzodiazepine;
1-dibutylaminoethyl-2-ethoxy-5-phenyl-6-aza-7-chloro-1,2-dihydro-3H-1,4-benzodiazepine;
1-dibutylaminoethyl-2-hydroxy-3-ethyl-5-phenyl-6-aza-7-chloro-1,2-dihydro-3H-1,4-benzodiazepine;
1-ethylpropylaminoethyl-2-ethoxy-5-phenyl-6-aza-7-chloro-1,2-dihydro-3H-1,4-benzodiazepine;
1-piperidinoethyl-2-hydroxy-5-phenyl-6-aza-7-chloro-1,2-dihydro-3H-1,4-benzodiazepine;
1-piperidinoethyl-2-ethoxy-5-phenyl-6-aza-7-chloro-1,2-dihydro-3H-1,4-benzodiazepine;
1-piperazinoethyl-2-hydroxy-5-phenyl-6-aza-7-chloro-1,2-dihydro-3H-1,4-benzodiazepine;
1-morpholinoethyl-2-hydroxy-5-phenyl-6-aza-7-chloro-1,2-dihydro-3H-1,4-benzodiazepine;
1-morpholinoethyl-2-methoxy-5-phenyl-6-aza-7-chloro-1,2-dihydro-3H-1,4-benzodiazepine;
1-morpholinoethyl-2-ethoxy-5-(o-chlorophenyl)-6-aza-7-chloro-1,2-dihydro-3H-1,4-benzodiazepine;
1-pyrrolidinoethyl-2-hydroxy-5-phenyl-6-aza-7-chloro-1,2-dihydro-3H-1,4-benzodiazepine;
1-homopiperazinoethyl-2-ethoxy-5-phenyl-6-aza-7-chloro-1,2-dihydro-3H-1,4-benzodiazepine;
1-piperidinobutyl-2-hydroxy-5-phenyl-6-aza-7-chloro-1,2-dihydro-3H-1,4-benzodiazepine;
1-dihexylaminoethyl-2-hydroxy-5-phenyl-6-aza-7-chloro-1,2-dihydro-3H-1,4-benzodiazepine.

The compounds can be prepared by methods which are known in themselves such as:
a. in a compound of formula II

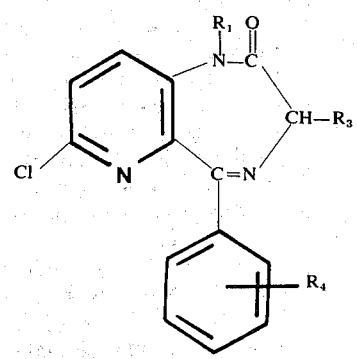

wherein $R_1$, $R_3$ and $R_4$ are as defined above, the oxo group is reduced to a hydroxy group or
b. reacting a compound of the formula:

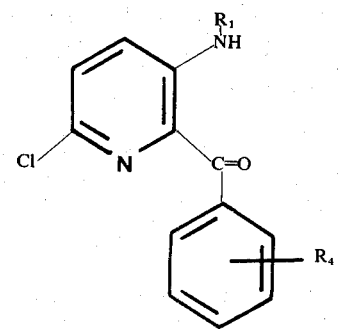

III with a compound of the formula:

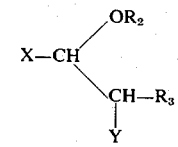

IV wherein $R_1$, $R_2$, $R_3$ and $R_4$ are as defined above, X is a halogen (e.g., chlorine, bromine, fluorine or iodine), a mercapto group or a hydroxy group and Y is an amino group or a halogen (e.g., chlorine, bromine, fluorine, or iodine). If Y is halogen, the reaction is carried out in the presence of ammonia or an ammonia derivative.

In a given case the compound obtained in process (a) or (b) can be treated with an alkylating agent and/or an acyl group present can be reduced to an alkyl group.

Process (a) can be carried out for example in inert solvents or suspension media such as aliphatic or cyclic ethers, e.g., diethyl ether, tetrahydrofuran, dioxane or ethylene glycol diethyl ether at temperatures between 0° and 100° C., for example 0° to 30°C., with agents which reduce an acidamide-oxo group to the corresponding hydroxy group. These types of reducing agents are, for example, metal hydrides and complex metal hydrides (lithium aluminum hydride) sodium borohydride, lithium diethoxy aluminum hydride, sodium diethoxy aluminum hydride, activated aluminum (aluminum amalgam), aluminum alcoholates (Meerwein-Ponndorf process, for example, by means of aluminum isopropylate-isopropanol), catalytic hydrogenation with metal catalysts, for example, noble metal catalysts, e.g., palladium or platinum, Raney catalysts (Raney-nickel, Raney-iron, Raney-cobalt) or copper, brass and chromite catalysts whereby in using the last named catalyst in a given case temperatures above 100° C. are required.

Process (b) can be carried out for example in customary solvents such as alcohols, e.g., ethanol, methanol, isopropanol, propanol or butanol, dioxane, tetrahydrofurane, toluene, benzene, pyridine, chloroform or mixtures of solvents, in a given case with addition of other tertiary amines such as triethyl amine or diisopropyl methyl amine at temperatures between 0° and 200° C., preferably at 50° to 150° C.

The components of formula IV can also be formed in situ in which for example an acetal of formula IV wherein X likewise can be the group $OR_2$ and $R_2$ can be as defined above (except that it cannot be hydrogen) is split with acid before the reaction.

In case starting component IV is present as aldehyde ($R_2$ is H and X is OH), the presence of acid catalysts, sulfonic acids such as methane sulfonic acid or p-toluene sulfonic, HCl, $H_2SO_4$, etc. is favorable or necessary.

If in process (b) compounds of formula IV are used wherein X is halogen (in case Y is an amino group it is preferably blocked by protecting groups) the process can be carried out for example as follows:

A compound of formula III wherein $R_1$ is hydrogen and $R_4$ is as defined above is acylated with an aliphatic acid halide, e.g., acetyl chloride or acetyl bromide, aliphatic acid ester, e.g., mono methyl succinate, aliphatic acid anhydride, e.g., acetic anhydride or ketone or benzoyl chloride in an inert solvent such as dioxane, benzene, tetrahydrofurane or dimethyl formamide at a temperature between 0° and 150° C. The compound thus obtained after conversion into the alkali salt (by sodium hydride or sodamide) is reacted with one of the above named compounds of formula IV (e.g., in a non-basic solvent such as dioxane, dimethyl formamide or dimethyl sulfoxide at a temperature between 0° and 200°C). Subsequently, the acyl group, which is on the nitrogen atom in the 3-position of the pyridine ring is split off in acid or basic medium, whereby in a given case simultaneously ring closure takes place to compounds of formula I.

Frequently process (b) can also be carried out in such manner that the amino group in the 3-position of the compounds of formula III and/or the amino group of formula IV (Y is $NH_2$) has a known protective group. Frequently such protective groups are necessary for the production of the starting compounds.

In many cases the splitting of such a protective group takes place simultaneously with the cyclization.

These protective groups are easy to split off. There are used either easily solvolytically splittable acyl groups or hydrogenatingly splittable groups, as for example, the benzyl group. The solvolytically splittable protective groups are split off for example by saponification with dilute acids, e.g., HCl, or by means of basic substances (potassium carbonate, sodium carbonate, aqueous alkali solutions, e.g., aqueous sodium hydroxide, alcoholic alkali solutions, $NH_3$) at room temperature or also short boiling. Hydrogenatingly splittable groups such as the benzyl group or the carbobenzoxy radical are suitably split off in the presence of customary hydrogenation catalysts, especially palladium catalysts, in a solvent or suspension medium, in a given case under elevated pressure. As solvents or suspension medium there can be used for example, water, lower aliphatic alcohols, e.g., methyl alcohol, ethyl alcohol, or isopropyl alcohol, cyclic ethers such as dioxane or tetrahydrofurane, aliphatic ethers, e.g., diethyl ether, dimethyl formamide, etc., as well as mixtures of these agents.

As protective groups for the amino group there can be used, for example, the benzyl group, α-phenylethyl group, benzyl groups substituted in the benzene nucleus as for example, the p-bromo or p-nitrobenzyl group, the carbobenzoxy group, the carbobenzothio group, the trifluoroacetyl, the phthalyl radical, the trityl radical, the p-toluenesulfonyl radical and similar groups as well as simple acyl groups such as the acetyl group, formyl group, tert. butylcarboxy group, etc. There can be employed especially the protective groups used in the synthesis of peptides and the splitting processes customarily employed in that process.

Among others for this purpose reference is made to Jesse P. Greenstein and Milton Winitz "Chemistry of Amino Acids," John Wiley and Sons, Inc. New York (1961) Vol. 2, pages 883 et seq. Also there can be used carbalkoxy groups (for example of low molecular weight such as carbmethoxy, carbethoxy, and carbpropoxy).

Process (b) can also be carried out under some circumstances so that before the true cyclization there is isolated previously the intermediate product of the formula:

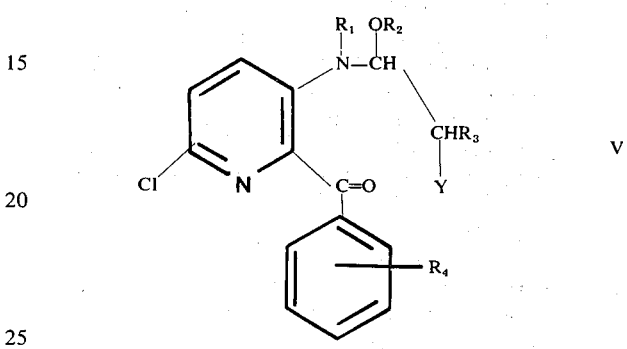

V

For this purpose the conversion to both reactants III and IV is suitably undertaken first at low temperatures, for example 0° to 30°C. These can then be purified or cyclized as they are formed. For this purpose there are used temperatures between −70° and +150°C., preferably 0° to 150°C. As solvents or suspending media besides those given above there can be used acetic anhydride, polyphosphoric acid, aliphatic ethers, e.g., diethyl ether, chloroform, etc. This cyclization can be carried out in a given case using acid condensation agents such as sulfuric acid, hydrochloric acid, hydrobromic acid, p-toluene sulfonic acid or polyphosphoric acid or basic condensation agents such as pyridine or tertiary amines.

When X is a halogen atom the cyclization is carried out in the presence of ammonia (for example liquid ammonia), whereupon there can also be present tertiary non guaternizing amines, for example, sterically hindered amines such as diisopropylethyl amine or 1,3-bis(dimethylamino)naphthalene. The halogen atoms employed are chlorine, bromine or iodine. In place of ammonia or additionally to ammonia there can also be used, for example, other derivatives of ammonia which replace a halogen atom by the group $NH_2$, for example, urotropine(hexamethylenetetramine), alkaliamide, e.g., sodamide, carboxylic acid amides, e.g., acetamide, in which acid radical for the carboxylic acid amide can contain the above recited protective groups as well as conventional protective groups.

When urotropine (hexamethylenetetramine) is used the process can be carried out as follows: boiling in chloroform (½ to 8 hours) and splitting off the separate urotropine compound with aqueous or aqueous-alcoholic inorganic acids (e.g., HCl or $H_2SO_4$) at temperatures between, for example, 20° and 150°C.

If acid amides are used it is recommended that there be used condensation agents such as sodium, alkali hydrides, e.g., sodium hydride, alkali amides (especially sodamides), Grignard compounds, lithium alkyls (e.g., butyl lithium) or in special cases, as with tosyl amides, there can be used weaker bases such as $K_2CO_3$, powdered NaOH or potassium hydroxide. As solvents above all dimethylsulfoxide and dimethyl formamide are suitable. There can also be used dioxane, tetrahydrofurane, alcohols, e.g., methyl alcohol, ethyl alcohol and isopropyl alcohol and ethers, e.g., diethyl ether. In using acid amides generally there are first obtained from the intermediate compound V compounds of formula V in which Y Is an amino group protected by the corresponding acid radical. The cyclization then takes placec simultaneously with or after splitting off of the protective group. In acid splitting off of the protective group it is generally possible to isolate the compounds of formula V in which Y is the amino group as either the salt or as the free base.

In case in process (B) there is used a starting material of formula III in which $R_1$ is acylated as mentioned supra such an acyl or protective group, in a given case after the end of the reaction, can be split off solvolytically or hydrogenatingly in the manner set forth above. However, it is also possible in using a pure aliphatic acyl group to reduce this group to an alkyl group (for example by means of complex alkali hydrides such as $LiAlH_4$).

The compounds obtained according to process (a) or (b) can be treated with alylating agents in case one or more of the radicals R1, $R_2$ and $R_3$ is hydrogen or $R_1$ is a hydroxyalkyl or aminoalkyl. For example, there can be introduced in this way into a compound of formula I wherein $R_2$ is hydrogen, an alkyl group with 1 to 6 carbon atoms, or an alkoxyalkyl group with 2 to 8 carbon atoms or there can be introduced into a compound of formula I wherein $R_3$ is hydrogen an alkyl or alkoxy group with 1 to 6 carbon atoms or there can be introduced into a compound of formula I wherein R is hydrogen an alkyl group of 1 to 6 carbon atoms, an alkenyl group of 2 to 6 carbon atoms, a hydroxyalkyl group having 1 to 6 carbon atoms, an alkoxyalkyl group having 2 to 8 carbon atoms, an aminoalkyl group having 2 to 7 carbon atoms, an alkylaminoalkyl having 3 to 13 carbon atoms or a dialkylaminoalkyl group having 4 to 20 carbon atoms wherein the alkyl groups form a saturated ring with the nitrogen atom which ring can contain an additional nitrogen or oxygen atom. Besides in a compound of formula I wherein $R_1$ is a hydroxyalkyl group, an aminoalkyl group or an alkylaminoalkyl group this radical $R_1$ can be alkylated on the hydroxy or amino group.

As this type of alkylating agent there can be used for example compounds of the formula R'Hal, R'OH, Ar-$SO_2OR'$ and $SO_2(OR')_2$ wherein Hal is a halogen atom (especially chlorine, bromine or iodine) and Ar is an aromatic radical as for example phenyl or naphthyl which in a given case, can be substituted by one or more lower alkyl groups and R' with the exception of hydrogen can have the same meaning as $R_1$, $R_2$ and $R_3$.

Examples of compounds for example are p-toluene sulfonic acid alkyl esters, e.g., methyl p-toluene sulfonate, ethyl p-toluene sulfonate, butyl p-toluene sulfonate, lower dialkyl sulfates, e.g., dimethyl sulfate and diethyl sulfate and the like as well as alkyl halides, e.g., methyl iodide, ethyl iodide, butyl iodide, methyl bromide, ethyl chloride. The alkylation reaction can be carried out, in a given case, with addition of customary acid binding agents such as alkali carbonates, e.g., sodium carbonate or potassium carbonate, pyridine or other customary tertiary amines, e.g., N,N-dimethyl aniline or triethyl amine, at temperatures between 0° and 150° C. in solvents such as lower alcohols, e.g., methyl alcohol, ethyl alcohol, isopropyl alcohol or propyl alcohol, ethers, e.g., diethyl ether, dioxane, dimethyl formamide, dimethyl sulfoxide, aromatic hydrocarbons such as benzene or toluene or acetone as well as mixtures of such solvents. In a given case, acid catalysts can also be used. Frequently it is favorable, especially with the components R'Hal or R'OH to work with an excess of this compound. Above all this is true for the introduction of $R_2$ wherein R' for example is an alkyl group with 1 to 6 carbon atoms or an alkoxyalkyl group with 2 to 8 carbon atoms. In many cases the alkylation of the two hydroxy groups occurs already in allowing to stand at room temperature a solution in the corresponding alcohol of $R_2OH$ of a compound of formula I wherein $R_2$ is H. Conversely under analogous conditions by reaction with aqueous mixtures there can be effected an ether splitting with formation of compounds of formula I where $R_2$ is H.

In the alkylation it is also possible to proceed so that there is first produced from the reacting compound of formula I in which $R_1$ and/or $R_2$ and/or $R_3$ is H an alkali compound by reacting the compound of formula I with an alkali metal, alkali hydride or alkali amide (especially sodium e.g., finely divided sodium, or sodium compounds) in an inert solvent such as dioxane, dimethyl formamide, benzene or toluene at temperatures between 0° and 150° C and then to add the alkylating agent.

In place of the alylation agents mentioned, there can also be used other chemically equivalent agents (see, for example, L. F. and Mary Fieser, *Reagents for Organic Synthesis*, Vol. 2, page 471).

Basic compounds of formula I can be converted into their salts by conventional methods. As anions for these salts there can be employed the known and therapeutically usable (pharmacologically or pharmaceutically acceptable) acid residues. For example, there can be used acids such as sulfuric acid, phosphoric acid, hydrohalic acids, e.g., hydrochloric acid or hydrobromic acid, ethylenediamine tetraacetic acid, sulfamic acid, benzene sulfonic acid, p-toluene sulfonic acid, camphor sulfonic acid, methane sulfonic acid, guarazulene sulfonic acid, maleic acid, fumaric acid, oxalic acid, tartaric acid, lactic acid, citric acid, ascorbic acid, glycolic acid, salicylic acid, acetic acid, propionic acid, gluconic acid, benzoic acid, acetamidoacetic acid, hydroxyethane sulfonic acid, malonic acid.

The free bases can be produced again from the salts of the compounds in customary manner, for example, by treatment of a solution in an organic medium, such as alcohols (e.g., methanol, ethanol or isopropanol) with soda or soda lye (caustic soda solution).

Those compounds of formula I which contain asymmetric carbon atoms and as a rule result as racemates, can be split into the optically active issomers in known manner with the help of an optically active acid. However it is also possible to employ from the beginning an optically active starting material whereby a correspondingly optically active or diastereomer form is obtained as the end product.

The compounds of the invention are suitable for the production of pharmaceutical compositions. The pharmaceutical compositions or medicaments can contain one or more of the compounds of the invention or mixtures of the same with other pharmaceutically active materials. For the production of pharmaceutical preparations there can be used the customary pharmaceutical carriers and assistants. The medicines can be employed enterally, parenterally, orally or perlinqually. For example, dispensing can take place in the form of tablets, capsules, pills, dragees, plugs, salves, jellies, cremes, powders, liquids, dusts or aerosols. As liquids there can be used, for example, oily or aqueous solutions or suspensions, emulsions, injectable aqueous and oily solutions or suspensions.

For example, there can be made and used in the invention compounds of formula I where the symbols $R_1$ to $R_4$ have the following meaning:

$R_1$ is methyl, allyl, dimethylaminoethyl;
$R_2$ is hydrogen, methyl, ethyl, methoxyethyl;
$R_3$ is hydrogen, methoxy;
$R_4$ is hydrogen, o-fluoro, o-chloro.

An especially favorable activity is possessed by compounds where $R_1$ is methyl, $R_2$ is hydrogen or methyl, $R_3$ is hydrogen, and $R_4$ is hydrogen, fluorine or chlorine.

The starting compounds used in process (a), e.g., can be prepared for example according to the process of von Bebenburg et al U.S. application Ser. No. 313,542, filed Dec. 8, 1972 now abandoned or in analogous manner to that process. The entire disclosure of the von Bebenburg et al U.S. Application is hereby incorporated by reference. These starting compounds are claimed as new compounds in said von Bebenburg et al application.

Unless otherwise indicated, all parts and percentages are by weight.

EXAMPLE 1

1-methyl-2-hydroxy-5-phenyl-6-oza-7-chloro-1,2-dihydro-3H-1,4benzodiapine:

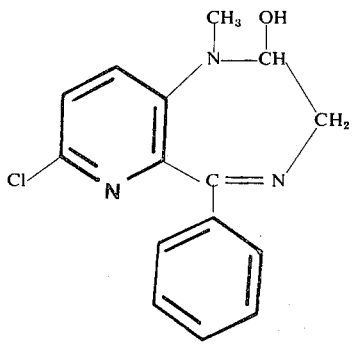

To a solution of 14 grams of 1-methyl-5-phenl-6aza-7-chloro-1,2-dihydro-3H-1,4-benzodiazepinone-(2) (prepared as described in Example 17 of the von Bebenburg et al U.S. Application 313,542) in 300 ml of tetrahydrofurane there were dropped in with stirring at 0°C. within 5 minutes a solution of 12 grams of sodium diethoxy-dihydrogen aluminate (70% in benzene) in 150 ml of tetrahydrofurane. The mixture was stirred for an additional 15 minutes at 0°C. At 0° C. there were then added 300 ml of water saturated diethyl ether with stirring within 5 minutes and the mixture stirred for 30 minutes, then filtered and the filtrate evaporated in a vacuum. The residue was recrystallized from ether-petroleum ether.

Yield 8.5 grams; M.P. 128° to 130° C.

EXAMPLE 2

1-methyl-2-ethoxy-5-(o-chlorophenyl)-6-oza-7-chloro-1,2-dihydro-3H-1,4-benzodiazepine:

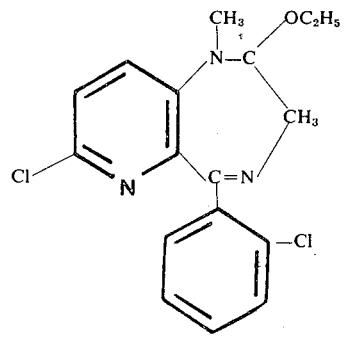

10 grams of 1-methyl-5-(o-chlorophenyl)-6-aza-7-chloro-1,2-dihydro-3H-1,4-benzo-diazepinone-(2) (prepared as described in Example 21 of the von Bebenburg et al U.S. application Ser. No. 313,542) were dissolved in 250 ml of tetrahydrofurane and the solution cooled to 0° to −10°C. With stirring there were added during 20 minutes 9 grams of sodium bis(2-methoxyethoxy) -aluminum hydride in benzene (70% solution), then there were dropped in 300 ml of water saturated diethyl ether. The solution was filtered and the filtrate evaporated. The residue was dissolved in 6N ethanolic hydrochloric acid (30 ml) and allowed to stand for 1 hour. Then the reaction product was precipitated as a syrup with diethyl ether. The liquid was decanted from the syrup, the syrup dissolved in a little ethanol and heated with 10% aqueous ammonia to turbidity. The reaction product crystallized out slowly. M.P. 140°–142°C.

The compounds of the invention are suited for the production of pharmaceutical compositions and preparations. The pharmaceutical compositions or drugs contain as the active material one or several of the compounds of the invention, in a given case in admixture with other pharmacologically or pharmaceutically effective materials. The production of the medicine can take place with the use of known and customary pharmaceutical assistants, carriers and diluents.

Such carriers and assistants as set forth for example are those recommended in the following literature as adjuvants for pharmacy, cosmetic and related fields such as in Ullmann's Encyklopadie der technischer Chemie, Vol. 4 (1953), pages 1 to 39; Journal of Pharmaceutical sciences, Vol. 52, (1963 ), pages 918 et seq.; H.v. Czetsch-lindenwald, Hilfstoffe fur Pharmazie und angrenzende Gebiete; Pharm. Ind. Vol. 2 (1961), pages 72 et seq.; Dr. H. P. Fiedler, Lexicon der Hilfstoffe fur Pharmazie, Kosmetik und angrenzende Gebiete, Cantor Kg. Aulendorf i. Wurtt, 1971.

Examples of such materials include gelatin, natural sugars such as sucrose or lactose, lecithin, pectin, starch (for example corn starch), tylose, talc, lycopodium, silica (for example colloidal silica), glucose, cellulose, cellulose derivatives for example cellulose ethers in which the cellulose hydroxyl groups are partially etherified with lower aliphatic alcohols and/or lower saturated oxyalcohols, (for example, methyl hydroxypropyl cellulose, methyl cellulose, hydroxyethyl cellulose), stearates, e.g., methylstearate, and glyceryl stearate, magnesium and calcium salts of fatty acids with 12 to 22 carbon atoms, especially saturated acids (for example calcium stearate, calcium laurate, magnesium oleates, calcium palmitate, calcium behenate and magnesium stearate), emulsifiers, oils and fats, especially of plant origin, for example, peanut oil, castor oil, olive oil, sesame oil, cottonseed oil, corn oil mon-, di- and triglycerides of saturated fatty acids ($CH_{12}H_{24}O_2$ to $C_{18}H_{36}O_2$ and their mixtures, e.g., glyceryl monostearate, glyceryl distearate, glyceryl tristearate, glyceryl trilaurate), pharmaceutically compatible monoor polyvalent alcohols and polyglycols such as glycerine, mannitol, sorbitol, pentaerythritol, ethyl alcohol, diethylene glycol, triethylene glycol, ethylene glycol, propylene glycol dipropylene glycol, polyethylene glycol 400 and other polyethylene glycols, as well as derivatives of such alcohols and polyglycols, esters of saturated and unsaturated fatty acids (2 to 22 carbon atoms, especially 10 to 18 carbon atoms), the mono- (1 to 20 carbon atoms alkanols) or polyhydric alcohols such as glycols, glycerine, diethylene glycol, pentaerythritol, sorbitol, mannitol, ethyl alcohol, butyl alcohol, octadecyl alcohol, etc. e.g., glyceryl stearate, glyceryl palmitate, glycol distearate, glycol dilaurate, glycol diacetate, monoacetin, triacetin, glyceryl oleate, ethylene glycol stearate; such esters of polyvalent alcohols can in a given case also be etherified, benzyl benzoate, dioxolane, glycerine formal, glycol furfural, dimethyl acetamide, lactamide, lactates, e.g., ethyl lactate, ethyl carbonate, silicones (especially middle viscosity dimethyl polysiloxane) and the like.

For the production of solutions there can be used water or physiologically compatible organic solvents, as for example, ethanol, 1,2-propylene glycol, polyglycols, e.g., diethylene glycol, triethylene glycol and dipropylene glycol and their derivatives, dimethyl sulfoxide, fatty alcohols, e.g., stearyl alcohol, cetyl alcohol, lauryl alcohol and oleyl alcohol, triglycerides, e.g., glyceryl oleate, glyceryl stearate, glyceryl palmitate, and glyceryl acetate, partial esters of glycerine, e.g., monoacetin, diacetin, glyceryl monostearate, glyceryl distearate, glyceryl monopalmitate, paraffins and the like.

In the production of the preparations there can be used known and conventional solvent aids. As solvent aids there can be used, for example, polyoxyethylated fats, e.g., polyoxyethylated oleo triglyceride, linolized oleotriglyceride. Examples of oleotriglycerides are olive oil, peanut oil, castor oil, sesame oil, cottonseed oil, corn oil (see also Dr. H. P. Fiedler, Lexikon der Hilfsstoffe fur Pharmazie, Kosmetik und angrenzende Gebiete, 1971, pages 191, to 195.

Polyoxyethylated means that the materials in question contain polyoxyethylene chains whose degree of polymerization is generally between 2 and 40 and especially between 10 and 20. Such materials can be obtained for example by reaction of the corresponding glyceride with ethylene oxide (for example 40 moles of ethylene oxide per mole of glyceride).

Furthermore, there can be added preservatives, stabilizers, buffers, taste correctives, antioxidants and complex formers (for example ethylendiamine tetraacetic acid) and the like. In a given case for stabilization of the active molecule the pH is adjusted to about 3 to 7 with physiologically compatible acids or buffers. Generally, there is preferred as neutral as possible to weak acid (to pH 5) pH value. As antioxidants there can be used for example sodium meta bisulfite, ascorbic acid, gallic acid, alkyl gallates, e.g., methyl gallate and ethyl gallate, butyl hydroxyanisole, nordihydroguararetic acid, tocopherols such as tocopherol and synergists (materials which bind heavy metals by complex formation, for example, lecithin, ascorbic acid, phosphoric acid). The addition of synergists increases considerably the antioxidant activity of tocopherol. As preservatives there can be used for example sorbic acid, p-hydroxybenzoic acid esters (for example lower alkyl esters such as the methyl ester and the ethyl ester benzoic acid), sodium benzoate, trichloroisobutyl alcohol, phenol, cresol, benzethonium chloride and formalin derivatives.

The pharmacological and galenical treatment of the compounds of the invention takes place according to the usual standard methods. For example, the active material or materials and assistants or carriers are well mixed by stirring or homogenization (for example by means of a colloid mill or ball mill), wherein the operation is generally carried out at temperatures between 20° and 80° C., preferably 20° to 50° C.

The drugs can be used for example orally, parenterally, rectally, vaginally, perlingually or locally.

It is also possible to add other medicines.

The compounds of the invention have a good anxiolytic activity and tranquilizing activity in the conflict test according to Tedeschi (mouse) and the motility test on the mouse in the circular cage according to Filteim.

This activity is comparable to the activity of known medicine Diazepoxide.

The lowest effective dosage in the above-mentioned animal experiments is for example 0.5 mg/kg body weight orally, 0.1 mg/kg body weight sublingually and 0.05 mg/kg intravenously.

As general dosage ranges there can be used 0.5 to 10 mg/kg body weight orally, 0.1 to 2 mg/kg body weight sublingually and 0.05 to 1 mg/kg intravenously.

The compounds of the invention can be used in treatment of nervousness, stress, anxiety, restless conditions, adaptability and behavior disturbances of children, vegetative dystony, irritability, moodiness, lamp fever (of actors), weather fever, functional cardiovascular, gastrointestinal and respiratory illnesses. They also are useful for making birth easier, in menstrual and climatic disturbances, and in preparation for operation.

The pharmaceutical preparations generally contain between 1 and 10% of the active component (or components) of the invention.

The compounds can be delivered in the form of tablets, capsules, pills, dragees, suppositories, salves, gels, creams, powders, liquids, dusts or aerosols. As liquids there can be used oily or aqueous solutions or suspensions, emulsions. The preferred forms of use are as tablets which contain between 1 and 50 mg of active material or solutions which contain between 0.1 and 5% of active material.

In individual doses the amount of active component of the invention can be used for example in an amount of:

a. in oral dispensation between 1 and 50 mg;
b. in parenteral dispensation (for example intravenously, intramuscularly) between 0.1 and 5 mg;
c. in inhalation dispensation (solutions or aerosols) between 0.5 and 10 mg;
d in rectal or vaginal dispensation between 1 and 50 mg. (The dosages in each case are based on the free base).

For example, there is recommended the use of 1 to 3 tablets containing 1 to 50 mg of active ingredient 3 times daily or for example, intravenously the injection 1 to 3 times daily of a 1 to 2 ml ampoule containing 0.1 to 10 mg of active substance. In oral preparations the minimum daily dosage for example is 3 mg; the maximum daily dosage should not be over 200 mg.

In the treatment of dogs and cats the oral individual dosage in general is between about 0.5 and 50 mg/kg body weight; the parenteral individual dosage is between about 0.1 and 10 mg/kg body weight. In the treatment of horses and cattle the individual dosage orally is generally between 5 and 100 mg/kg; the parenteral individual dosage is between 1 and 20 mg/kg body weight.

The acute toxicity of the compounds of the invention in the mouse (expressed by the $LD_{50}$ mg/kg method of Miller and Tainter, *Proc. Soc. Exper. Biol. and Med.*, Vol. 57 (1944), pages 261 et seq.) in oral application is between 500 mg/kg and 10,000 mg/kg (or above 8000 mg/kg).

The drugs can be used in human medicine, in veterinary medicine, e.g., to treat cats, dogs, horses, sheep, cattle, goats and pigs or in agriculture. The drugs can be used alone or in admixture with other pharmacologically active materials.

The salts can also be used as curing agents for melamine-formaldehyde resins.

What is claimed is:

1. A 6-aza-1,2-dihydro-3H-1,4-benzodiazepine of the formula:

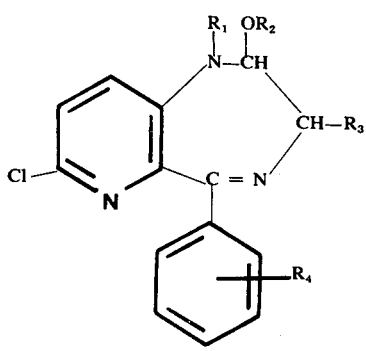

wherein:

$R_1$ is hydrogen, lower alkyl, lower alkenyl, cycloalkyl, hydroxy lower alkyl, lower alkoxy lower alkyl, amino lower alkyl, mono lower alkyl aminoalkyl, di-lower alkylamino lower alkyl;
$R_2$ is hydrogen, lower alkyl or lower alkoxy lower alkyl;
$R_3$ is hydrogen, lower alkyl or lower alkoxy;
$R_4$ is hydrogen or halogen, or a pharmaceutically acceptable salt thereof.

2. A 6-aza-1,2-dihydro-3H-1,4-benzodiazepine of the formula:

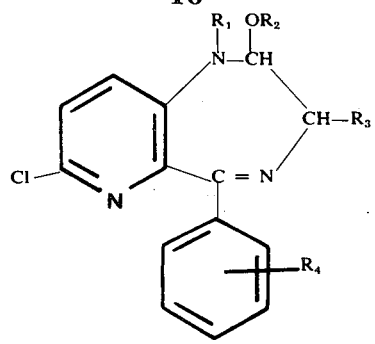

wherein:

$R_1$ is hydrogen, alkyl of 1 to 6 carbon atoms, alkenyl of 2 to 6 carbon atoms, cycloalkyl of 3 to 6 carbon atoms, hydroxy alkyl of 1 to 6 carbon atoms, alkoxy alkyl having a total of 2 to 8 carbon atoms, amino alkyl of 2 to 7 carbon atoms, mono alkyl aminoalkyl of 2 to 7 carbon atoms having 1 to 6 carbon atoms in the alkyl substituent on the amino nitrogen atom, dialkylamino alkyl of 2 to 7 carbon atoms having 1 to 6 carbon atoms in each alkyl substituent on the amino nitrogen atom;
$R_2$ is hydrogen, lower alkyl or lower alkoxy lower alkyl;
$R_3$ is hydrogen, lower alkyl or lower alkoxy;
$R_4$ is hydrogen or halogen, or a pharmaceutically acceptable salt thereof.

3. A compound according to claim 2 wherein $R_4$ is hydrogen or halogen of atomic weight 9 to 80.

4. A compound according to claim 3 wherein:

$R_1$ is hydrogen, alkyl of 1 to 4 carbon atoms, alkenyl of 2 to 4 carbon atoms, cycloalkyl of 5 to 6 carbon atoms, alkoxyalkyl having a total of 2 to 6 carbon atoms, aminoalkyl having 2 to 5 carbon atoms, aminoalkyl of 2 to 5 carbon atoms having 1 to 2 alkyl substituents of 1 to 4 carbon atom;
$R_2$ is hydrogen, alkyl of 1 to 4 carbon atoms, or alkoxyalkyl having a total of 2 to 6 carbon atoms;
$R_3$ hydrogen, of 1 to 4 carbon atoms or alkoxy having a total of 1 to 6 carbon atoms; and
$R_4$ is hydrogen, chlorine or fluorine.

5. A compound according to claim 3 wherein:
$R_1$ is methyl, allyl or dimethylaminoethyl;
$R_2$ is hydrogen, methyl, ethyl or methoxyethyl;
$R_3$ is hydrogen or methoxy; and
$R_4$ is hydrogen, o-chloro or o-fluoro.

6. A compound according to claim 3 wherein:
$R_1$ is hydrogen or alkyl of 1 to 6 carbon atoms;
$R_2$ is hydrogen or alkyl of 1 to 6 carbon atoms;
$R_3$ is hydrogen.

7. A compound according to claim 6 wherein:
$R_1$ is alkyl of 1 to 3 carbon atoms;
$R_2$ is hydrogen or alkyl of 1 to 3 carbon atoms;
$R_3$ is hydrogen; and
$R_4$ is hydrogen or chlorine.

8. A compound according to claim 7 which is 1-methyl-2-hydroxy-5-phenyl-6-oza-7-chloro-1,2-dihydro-3H-1,4-benzodiazepine.

9. A compound according to claim 7 which is 1-methyl-2-ethoxy-5-(o-chlorophenyl)-6-oza-7-chloro-1,2-dihydro-3H-1,4-benzodiazepine.

10. A compound according to claim 7 wherein $R_1$ is methyl.

11. A compound according to claim 3 wherein $R_1$ is hydrogen or methyl.

12. A compound according to claim 11 wherein $R_1$ is methyl.

* * * * *